United States Patent
Yonezawa et al.

(10) Patent No.: US 9,575,247 B2
(45) Date of Patent: Feb. 21, 2017

(54) MULTIMODE OPTICAL FIBER

(71) Applicant: SUMITOMO ELECTRIC INDUSTRIES, LTD., Osaka-shi, Osaka (JP)

(72) Inventors: Kazuhiro Yonezawa, Yokohama (JP); Sotaro Ida, Yokohama (JP); Tadashi Enomoto, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 303 days.

(21) Appl. No.: 14/306,604

(22) Filed: Jun. 17, 2014

(65) Prior Publication Data

US 2016/0216439 A1  Jul. 28, 2016

(51) Int. Cl.
*G02B 6/028* (2006.01)
*G02B 6/036* (2006.01)

(52) U.S. Cl.
CPC ........ *G02B 6/0288* (2013.01); *G02B 6/0281* (2013.01); *G02B 6/0365* (2013.01); *G02B 6/03627* (2013.01)

(58) Field of Classification Search
None
See application file for complete search history.

(56) References Cited

U.S. PATENT DOCUMENTS

| | | | |
|---|---|---|---|
| 7,787,731 B2 | 8/2010 | Bookbinder et al. | |
| 8,280,213 B2 | 10/2012 | Molin et al. | |
| 8,428,410 B2 | 4/2013 | Molin et al. | |
| 8,705,922 B2* | 4/2014 | Bickham | G02B 6/0288 385/123 |
| 8,731,358 B2* | 5/2014 | Pare | G02B 6/03661 385/126 |
| 9,329,335 B2* | 5/2016 | Balemarthy | G02B 6/0288 |
| 2011/0081123 A1* | 4/2011 | Pare | G02B 6/03661 385/124 |
| 2013/0230289 A1 | 9/2013 | Hammerle et al. | |
| 2015/0226916 A1* | 8/2015 | Sakabe | G02B 6/0288 385/128 |
| 2015/0253498 A1* | 9/2015 | Balemarthy | G02B 6/0288 385/124 |
| 2015/0253499 A1* | 9/2015 | Balemarthy | G02B 6/0288 385/124 |

OTHER PUBLICATIONS

David Mazzarese et al., "Comparison of Bend Insensitive and Standard Multimode Fiber," International Wire & Cable Symposium, Proceedings of the 60th IWCS Conference, Nov. 6-9, 2011, pp. 160-167.

* cited by examiner

*Primary Examiner* — Rhonda Peace

(74) *Attorney, Agent, or Firm* — Drinker Biddle & Reath LLP

(57) ABSTRACT

An embodiment of the present invention relates to an MMF with a structure for reducing length dependence of optical characteristics while maintaining bend-insensitivity. The MMF has a trench portion provided between a core portion and a cladding portion and having a refractive index lower than that of the cladding portion. In a cross section of the MMF, the trench portion in at least a partial section of the MMF has a non-circularly symmetric shape with respect to an intersection between the optical axis and the cross section.

13 Claims, 6 Drawing Sheets

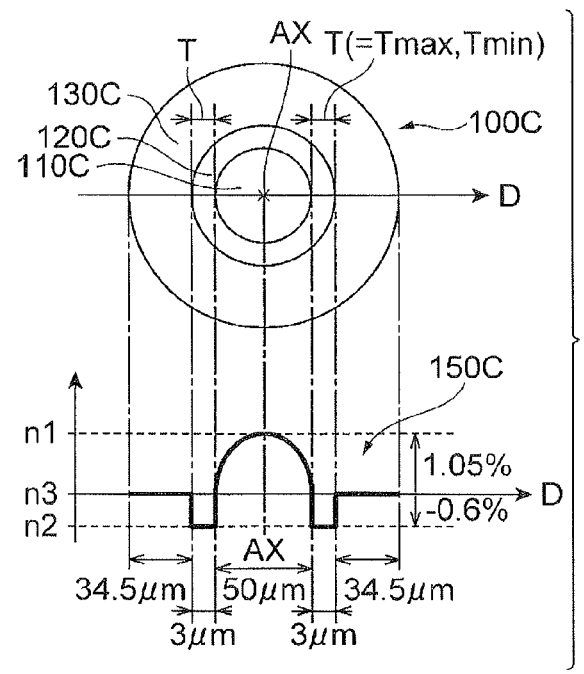
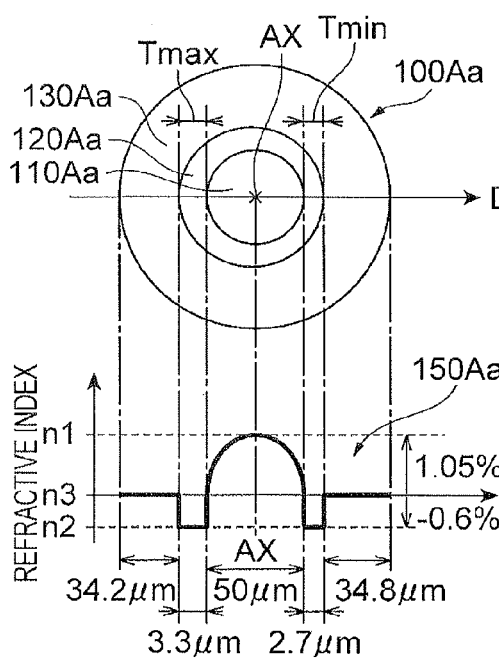
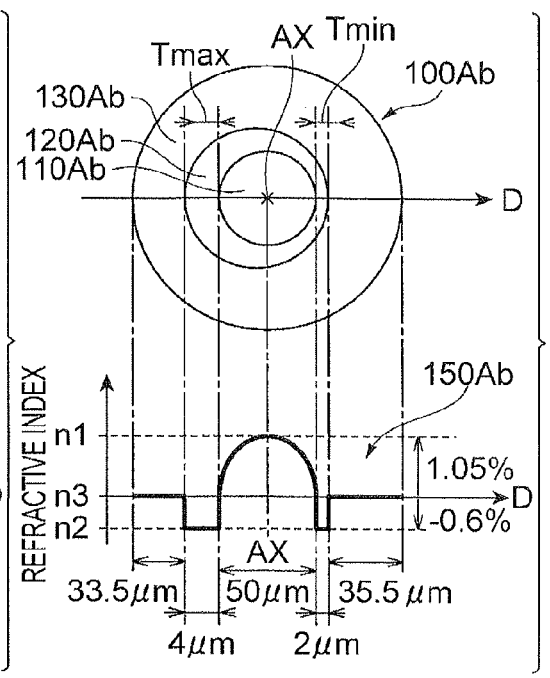

Fig.6A
| 2-TURN BENDING LOSS | | | | |
|---|---|---|---|---|
| BENDING RADIUS R | STANDARD MMF | COMPARATIVE EXAMPLE | FIRST SAMPLE | SECOND SAMPLE |
| 10.0mm | 0.15dB | 0.03dB | 0.03dB | 0.04dB |
| 7.5mm | 0.34dB | 0.06dB | 0.05dB | 0.07dB |
| 5.0mm | 0.80dB | 0.14dB | 0.17dB | 0.15dB |
Fig.6B
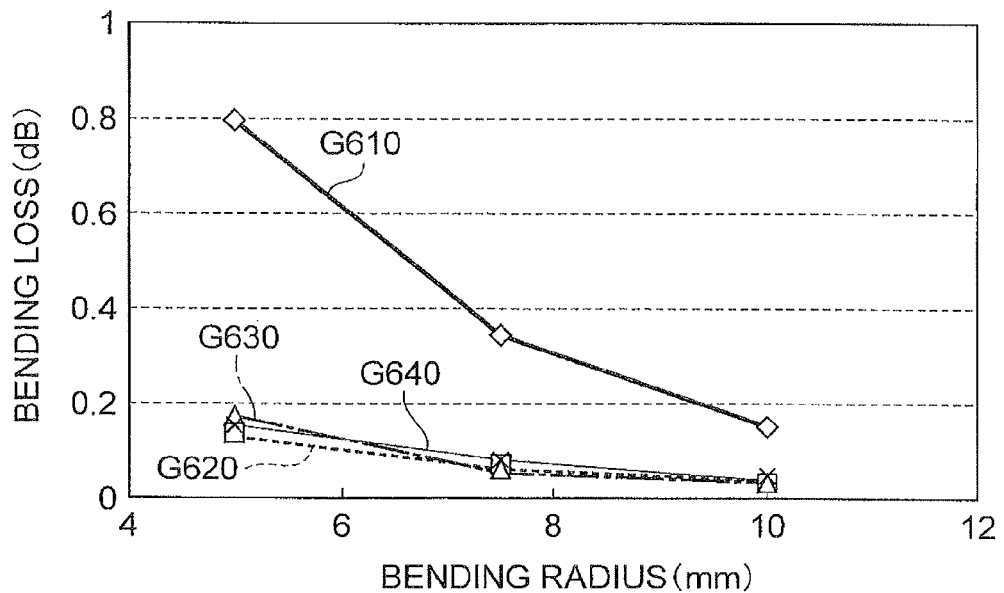
Fig.6C
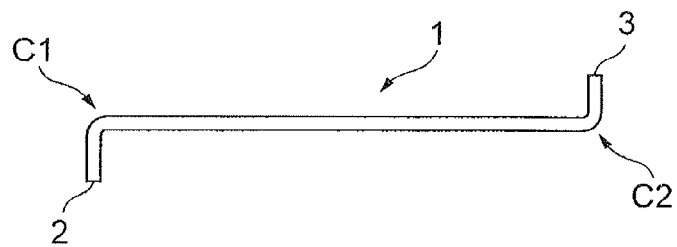

MULTIMODE OPTICAL FIBER

BACKGROUND OF THE INVENTION

Field of the Invention

The present invention relates to a bend-insensitive GI (Graded Index) type multimode optical fiber.

Related Background Art

It is known that a multimode optical fiber (hereinafter referred to as MMF) has a transmission loss which is caused by its structure and is larger than that of a single-mode optical fiber (hereinafter referred to as SMF) for long-haul optical communication. On the other hand, the MMF is widely used for short-haul information transmission such as LAN (Local Area Network) because it is easy to establish fiber-fiber connection because of its low splice loss and it becomes feasible to readily construct a network by using an equipment with a low specification.

Particularly, the GI type MMF used for short-haul information transmission tends to have a larger bending loss because the core radius is larger and a propagating light distribution is wider than that in the SI (Step Index) type SMF. Then, for example, U.S. Pat. No. 7,787,731 (First Literature), U.S. Pat. No. 8,280,213 (Second Literature), and U.S. Pat. No. 8,428,410 (Third Literature) disclose the bend-insensitive GI type multimode optical fibers (hereinafter referred to as BI-MMF) having the bending loss reduced by providing a trench portion with the refractive index lower than those of a core portion and a cladding portion and with a small width, outside the core portion.

SUMMARY OF THE INVENTION

The Inventors conducted research on the conventional BI-MMF and found the problem as described below.

Namely, the BI-MMF with the trench portion for enhancing bend-insensitivity demonstrates excellent insensitivity to the bending loss but tends to show large variation in optical characteristics thereof depending upon fiber length to be used (length dependence of optical characteristics). In the case of a standard MMF (standard GI type MMF of a double-layer structure composed of the core portion and the cladding portion, without the trench portion), leaky modes, which affect the optical characteristics of the GI type MMF, leak into the cladding portion immediately after light incidence and thus the optical characteristics of the GI type MMF become stable in a relatively short distance (fiber length) from a light incidence end. On the other hand, in the case of the BI-MMF, the leaky modes propagate through some length ranging from several meters to several hundred meters because of optical confinement function of the trench portion.

Therefore, the BI-MMF, which is often used in relatively short fiber length, has to be used in an unstable state in which the optical characteristics thereof vary due to the fiber length. Such a situation is reported as a phenomenon of variation in NA value depending upon fiber length, in David Mazzarese, et al., "Comparison of Bend Insensitive and Standard Multimode Fiber," International Wire & Cable Symposium, Proceedings of the 60th IWCS Conference, Nov. 6-9, 2011, pp. 160-167 (Fourth Literature) and U.S. Pat. Published Application No. 2013/0230289 (Fifth Literature).

The present invention has been accomplished in order to solve the problem as described above and it is an object of the present invention to provide a multimode optical fiber (BI-MMF) with a structure for reducing the length dependence of optical characteristics while maintaining the bend-insensitivity which is one of essential features of BI-MMF.

The variation in NA value in MMF is caused by difference in the number of modes which can propagate. On the other hand, the most important characteristic of MMF is the bandwidth. In general, the bandwidth of a 1000-m or longer MMF is evaluated in a wound state of the MMF on a bobbin, before shipment of the fiber. As long as the length is not less than 1000 meters, the leaky modes do not propagate even in the BI-MMF and the bandwidth can be measured in a state in which only the propagation modes (core modes) travel. However, the BI-MMF is mostly used in a cut state in length of not more than 100 meters in practice. For this reason, the leaky modes propagate in the BI-MMF and the BI-MMF in use (in the fiber length of not more than 100 m) has the increased number of propagation modes (which affect the bandwidth), when compared with the bandwidth evaluation result in the fiber length of 1000 m. As a result, the bandwidth in the short fiber length used in practice becomes different from that evaluated in the long fiber length before shipment of the fiber. Therefore, a preferred BI-MMF is one with reduced length dependence of optical characteristics, in terms of assurance of the bandwidth as well.

The present invention belongs to the GI type MMF which is definitely discriminated in structure from the SMF for long-haul transmission. Furthermore, the present invention relates to a BI-MMF with structural bend-insensitivity among the GI type MMF, in which a trench portion with a refractive index lower than that of a first cladding portion is provided inside the first cladding portion forming the outermost peripheral part of the multimode optical fiber, in order to achieve satisfactory bend-insensitivity. It is noted that in the present specification, when a "multimode optical fiber (MMF)" is simply stated, it refers to a GI type MMF.

The BI-MMF according to the present invention, as a first aspect, comprises a first structure having a core portion, a first cladding portion, and a trench portion provided between the core portion and the first cladding portion, or, a second structure having a core portion, a first cladding portion, a trench portion provided between the core portion and the first cladding portion, and a second cladding portion provided between the core portion and the trench portion. In the first structure, the core portion extends along the optical axis of the BI-MMF and is doped with $GeO_2$. The first cladding portion is provided around the outer periphery of the core portion and has a refractive index lower than a maximum refractive index of the core portion. The trench portion is provided between the core portion and the first cladding portion and has a refractive index lower than the refractive index of the first cladding portion. On the other hand, the second structure further has the second cladding portion between the core portion and the trench portion, in addition to the first structure. The second cladding portion has a refractive index lower than the maximum refractive index of the core portion and higher than the refractive index of the trench portion.

With either one of the above first and second structures, the BI-MMF according to the first aspect demonstrates the following characteristics: an α value, which defines a shape of a portion corresponding to the core portion in a refractive index profile in a radial direction of the BI-MMF, is from 1.9 to 2.2; a maximum relative refractive index difference Δ of the core portion to the first cladding portion is from 0.8 to 2.4%; a diameter of the core portion is from 25 μm to 65 μm.

Furthermore, in the BI-MMF according to the first aspect, the trench portion has a special sectional shape. Namely, in a cross section of the BI-MMF perpendicular to the optical axis, the trench portion in a section of a predetermined length forming at least a part of the BI-MMF has a non-circularly symmetric shape with respect to an intersection between the optical axis of the BI-MMF and the cross section, i.e., with respect to a center of the core portion. The trench portion has an inner periphery in contact with the core portion or with the second cladding portion and an outer periphery in contact with the first cladding portion and the sectional shape of the trench portion is defined by a region between the inner periphery and the outer periphery. Furthermore, a circularly symmetric shape with respect to the optical axis (the center of the core portion) means a shape that perfectly fits itself even after rotation at any angle about the optical axis. In the first aspect, the trench portion may have the foregoing special sectional shape throughout the entire length of the BI-MMF or may have the special sectional shape in a partial section of the BI-MMF. In either case, it is feasible to reduce the length dependence of optical characteristics while maintaining the desired bend-insensitivity.

As a second aspect applicable to the above first aspect, in the cross section of the BI-MMF, the trench portion may have a part where a thickness of the trench portion along the radial direction of the BI-MMF is 0.

As a third aspect applicable to at least either one of the above first and second aspects, in the cross section of the BI-MMF, where $T_{max}$ represents a maximum thickness of the trench portion along the radial direction of the BI-MMF and $T_{min}$ a minimum thickness of the trench portion along the radial direction of the BI-MIME, the trench portion preferably has a shape satisfying the following relation:

$$\frac{(T_{max} - T_{min})}{T_{min}} \geq 0.2.$$

As a fourth aspect applicable to at least any one of the above first to third aspects, in the cross section of the BI-MMF, the trench portion may have a shape satisfying the following relation:

$$\frac{(T_{max} - T_{min})}{T_{min}} \geq 1.0.$$

Furthermore, as a fifth aspect applicable to at least any one of the above first to fourth aspects, in the BI-MMF, a difference between an NA (Numerical Aperture) value in a length of 10 m and an NA value in a length of 100 m is preferably not more than 0.003. As a sixth aspect applicable to at least any one of the above first to fifth aspects, in the BI-MMF, the difference between the NA value in the 10-m length and the NA value in the 100-m length may be not more than 0.0016. The standard MMF is often used for premises networks, e.g., in base stations and there are increasing demands for MMF adjusted to fiber lengths of 10 to 100 m. Therefore, when the variation in optical characteristics is reduced among a plurality of MMFs in the fiber length ranging from 10 to 100 m, the scope of application of MMF becomes wider.

Each of the embodiments of the present invention will become more fully understood from the detailed description given hereinbelow and the accompanying drawings. It should be noted that these examples are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, and it is clear that various changes and improvements within the scope of the invention are obvious to those skilled in the art from this detailed description.

BRIEF DESCRIPTION OF THE DRAWINGS

FIG. 4A is a drawing showing a sectional structure and a refractive index profile of a sample prepared as a comparative example to the first profile structure of the first embodiment, FIG. 4B is a drawing showing a sectional structure and a refractive index profile of a first sample having the first profile structure, which was prepared as the first embodiment, and FIG. 4C is a drawing showing a sectional structure and a refractive index profile of a second sample having the first profile structure, which was prepared as the first embodiment.

FIGS. 6A and 6B are a table and graphs as collection of relationship between bending radius R and 2-turn bending loss for the standard MMF (without the trench portion), the sample of the comparative example, the first sample, and the second sample, and FIG. 6C is a drawing showing an example of installation of a BI-MMF.

DESCRIPTION OF THE PREFERRED EMBODIMENTS

Each of embodiments of the BI-MMF according to the present invention will be described below in detail with reference to the accompanying drawings. In the description of the drawings identical elements will be denoted by the same reference signs, without redundant description.

Figure 1A:
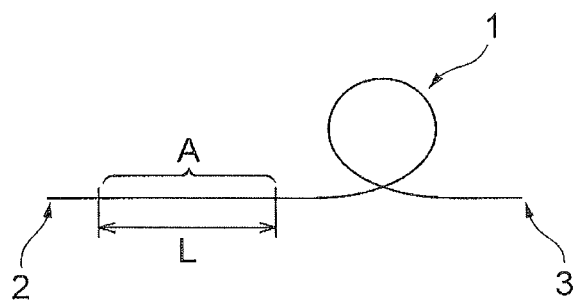
FIG. 1A is a drawing showing an overall configuration of a BI-MMF applicable to embodiments of the present invention.

FIG. 1A is a drawing showing an overall configuration of a BI-MMF applicable to embodiments of the present invention and the BI-MMF 1 in FIG. 1A has a structure having a first end 2 and a second end 3 opposite to the first end 2, and extending along the optical axis from the first end 2 to the second end 3, and belongs to the GI type MMF. Furthermore, the BI-MMF 1 has a structure in which a trench portion with the refractive index lower than that of a cladding portion located in the outermost peripheral region is provided around a core portion, and this structure realizes desired bend-insensitivity.

Figure 1B:
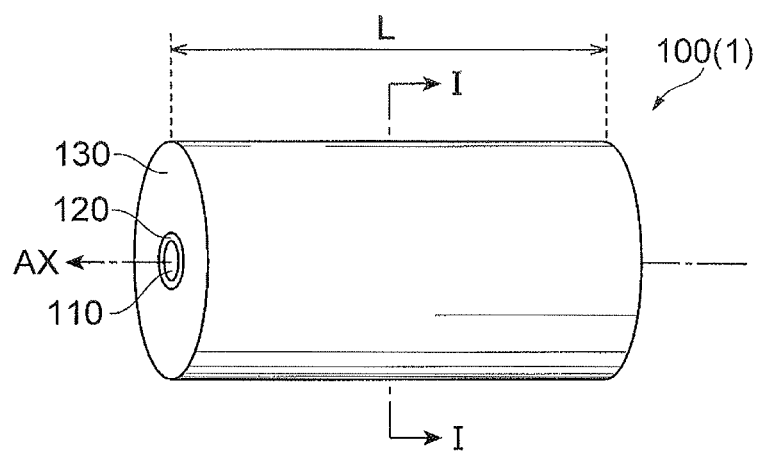
FIG. 1B is a perspective view showing a partial structure of a BI-MMF according to a first embodiment (first structure)
Figure 2A:
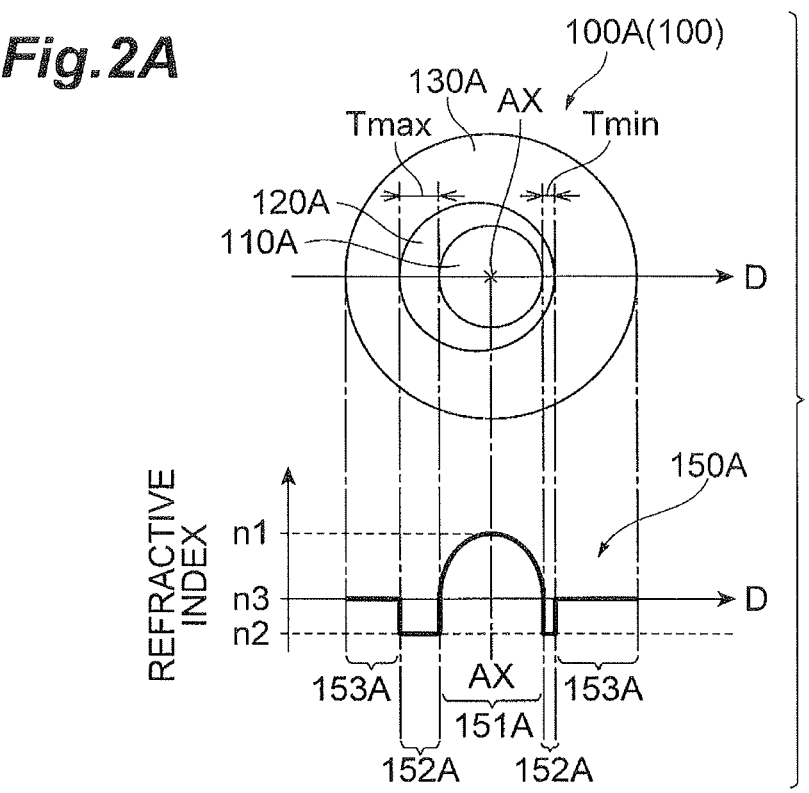
FIG. 2A is a drawing showing a sectional structure and a refractive index profile along the line I-I in FIG. 1B, as a first profile structure of the BI-MMF according to the first embodiment.
Figure 2B:
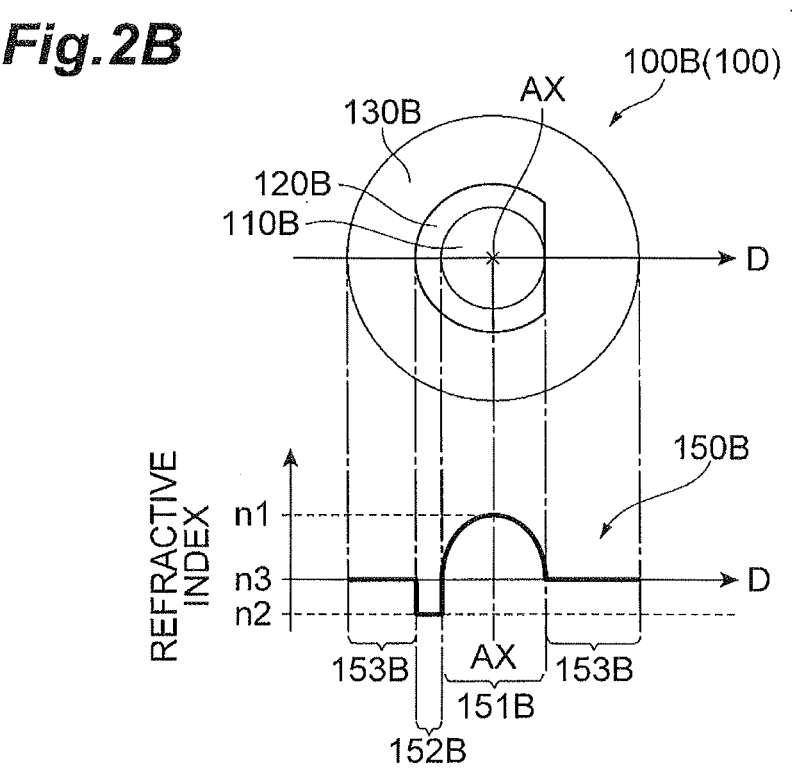
FIG. 2B is a drawing showing a sectional structure and a refractive index profile along the line I-I in FIG. 1B, as a second profile structure of the BI-MMF according to the first embodiment.

FIG. 1B is a perspective view showing a partial structure of a BI-MMF 100 according to the first embodiment, which corresponds to a section in length L indicated by "A" in FIG. 1A. This BI-MMF 100 according to the first embodiment has a core portion 110 extending along the optical axis AX, a trench portion 120 provided on the outer periphery of the core portion 110, and a first cladding portion 130 provided on the outer periphery of the trench portion 120, and the trench portion 120 has a special sectional shape as a sectional shape centered at the optical axis AX, as shown in FIGS. 2A and 2B. The trench portion 120 having the special sectional shape may be applied throughout the entire length of the BI-MMF 1 (FIG. 1A) or may be applied to a partial section of the BI-MMF 1. When the trench portion 120 having the special sectional shape is applied to a partial section of the BI-MMF 1, an optical fiber preform is manufactured, for example, by preparing an intermediate preform including a glass region to become the trench portion 120 having the special sectional shape and an intermediate preform including a glass region to become a trench portion with a nearly circular sectional shape centered at the optical axis AX and fusion-splicing them along their longitudinal direction. Thereafter, the optical fiber preform thus manufactured is drawn thereby to obtain the BI-MMF with the trench portion having the sectional shape varying in part.

Figure 1C:
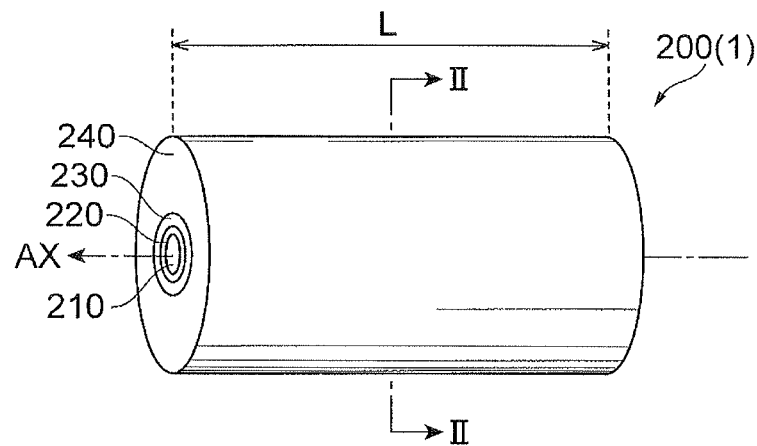
FIG. 1C is a perspective view showing a partial structure of a BI-MMF according to a second embodiment (second structure).
Figure 3A:
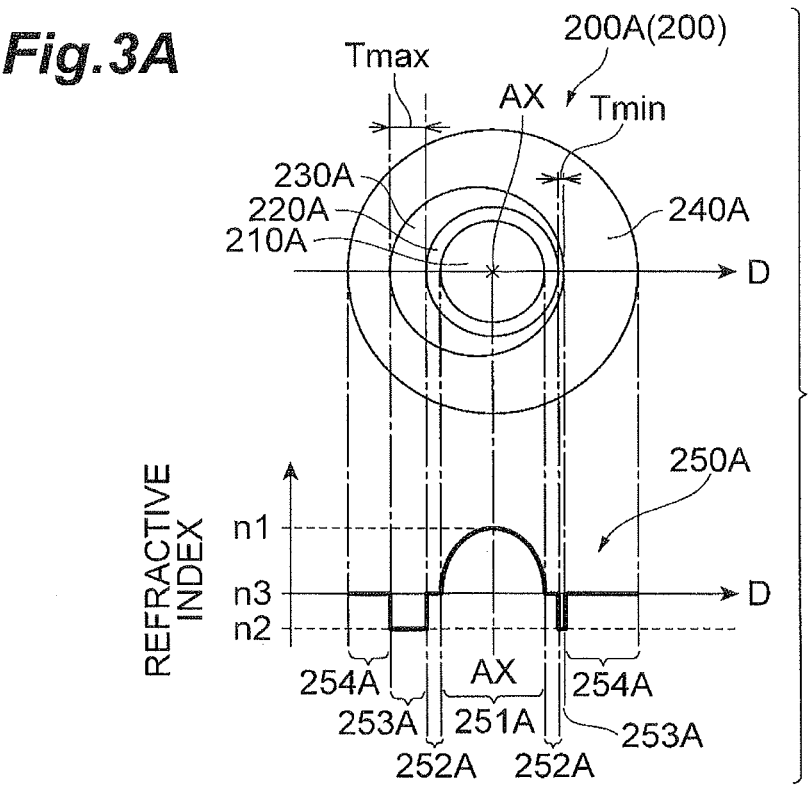
FIG. 3A is a drawing showing a sectional structure and a refractive index profile along the line II-II in FIG. 1C, as a first profile structure of the BI-MMF according to the second embodiment.
Figure 3B:
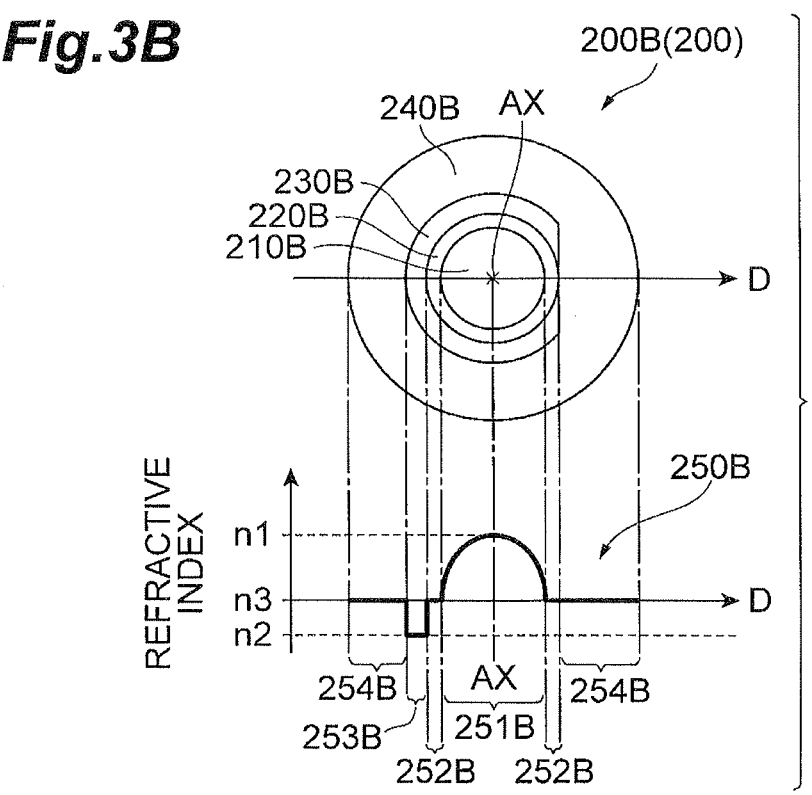
FIG. 3B is a drawing showing a sectional structure and a refractive index profile along the line II-II in FIG. 1C, as a second profile structure of the BI-MMF according to the second embodiment.

FIG. 1C is a perspective view showing a partial structure of a BI-MMF according to the second embodiment and this BI-MIME 200 according to the second embodiment also corresponds to the section in length L indicated by "A" in FIG. 1A. The BI-MMF 200 according to the second embodiment has a core portion 210 extending along the optical axis AX, a second cladding portion 220 provided on the outer periphery of the core portion 210, a trench portion 230 provided on the outer periphery of the second cladding portion 220, and a first cladding portion 240 provided on the outer periphery of the trench portion 230, and the trench portion 230 has a special sectional shape as a sectional shape centered at the optical axis AX, as shown in FIGS. 3A and 3B. The BI-MMF 200 according to the second embodiment is different from the structure of the BI-MMF 100 according to the first embodiment, in that the second cladding portion 220 is provided between the core portion 210 and the trench portion 230. Namely, the difference in structure between the BI-MMF 100 of the first embodiment and the BI-MMF 200 of the second embodiment is the distance between the core portion and the trench portion, but they are not different in the function of the trench portion itself. Therefore, concerning the technical effect of the BI-MMFs according to the embodiments of the present invention described below, there is no significant difference between the BI-MMF 100 of the first embodiment and the BI-MMF 200 of the second embodiment. In the second embodiment as well, the trench portion 230 having the special sectional shape may be applied throughout the entire length of the BI-MMF 1 (FIG. 1A) or may be applied to a partial section of the BI-MMF 1, as in the first embodiment. When the trench portion 230 having the special sectional shape is applied to a partial section of the BI-MMF 1, an example of method for manufacturing the BI-MMF is the same as in the case of the first embodiment.

First Embodiment

FIG. 2A is a drawing showing a sectional structure and a refractive index profile along the line I-I in FIG. 1B, as a first profile structure of the BI-MMF 100 according to the first embodiment, and FIG. 2B is a drawing showing a sectional structure and a refractive index profile along the line I-I in FIG. 1B, as a second profile structure of the BI-MMF 100 according to the first embodiment.

Specifically, the BI-MMF 100A having the first profile structure (which corresponds to the BI-MMF 100 according to the first embodiment) has, as shown in FIG. 2A, a core portion 110A extending along the optical axis AX, a trench portion 120A provided on the outer periphery of the core portion 110A, and a first cladding portion 130A provided on the outer periphery of the trench portion 120A. In the BI-MMF 100A shown in FIG. 2A, the core portion 110A is doped with $GeO_2$ for adjusting the shape of refractive index profile and has a maximum refractive index n1. The trench portion 120A is doped with a refractive index decreasing agent such as fluorine, for imparting bend-insensitivity to the BI-MMF 100A, and has a refractive index n2 (<n1). The first cladding portion 130A is pure silica or a glass region doped with an impurity for adjustment of refractive index and has a refractive index n3 lower than the maximum refractive index n1 of the core portion 110A and higher than the refractive index n2 of the trench portion 120A (n2<n3<n1).

Furthermore, the refractive index profile 150A of the BI-MMF 100A shown in FIG. 2A represents the refractive indices of the respective portions on a line D (coincident with a radial direction of the BI-MMF 100A) perpendicular to the optical axis AX and, more specifically, a region 151A indicates the refractive indices at respective points of the core portion 110A along the line D, a region 152A indicates the refractive indices at respective points of the trench portion 120A along the line D, and a region 153A indicates the refractive indices at respective points of the first cladding portion 130A.

Particularly, the region 151A in the refractive index profile 150A in FIG. 2A has such a dome shape (α-power refractive index profile) that the refractive index n(r) becomes the maximum refractive index at the center of the core portion 110A coincident with the optical axis AX (which is a position of an intersection between the optical axis AX and the cross section of the BI-MMF 100A), as represented by formula (1) below. The refractive index n(r) represents the refractive index of the core portion 110A with the radius a and refractive index at a distance r in the radial direction from the center of the core portion 110A. Therefore, concentrations of $GeO_2$ added for adjustment of refractive index also suddenly decrease from the center of the core portion 110A toward the adjacent trench portion 120A. The α value to define this dome shape is in the range of 1.9 to 2.2. A relative refractive index difference $\Delta_{core}$ of the center of the core portion 110A to the first cladding portion 130A (which is equivalent to a maximum relative refractive index difference of the core portion 110A to the cladding portion 130A) is in the range of 0.8 to 2.4%. The diameter of the core portion 110A is in the range of 25 μm to 65 μm. In the present specification, the same as the above-described structure of the core portion also applies to the structure of the core portion in the embodiments, comparative example, etc.

described below. The relative refractive index difference $\Delta_{core}$ of the core portion 110A to the first cladding portion 130A (the refractive index n3) is defined by formula (2) below and a relative refractive index difference $\Delta_{trench}$ of the trench portion 120A (the refractive index n2) to the first cladding portion 130A (the refractive index n3) is defined by formula (3) below. The following definitions about the relative refractive index differences are also applied to the below-described embodiments, samples, etc. having either the first profile structure or the second profile structure.

$$n(r) = n1\left(1 - 2\Delta_{core}\left(\frac{r}{a}\right)^{\alpha}\right)^{1/2} \quad (1)$$

$$\Delta_{core} = \frac{(n1^2 - n3^2)}{2n3^2} \times 100 \quad (2)$$

$$\Delta_{trench} = \frac{(n2^2 - n3^2)}{2n3^2} \times 100 \quad (3)$$

In the BI-MMF 100A having the first profile structure as the first embodiment, the trench portion 120A has the special sectional shape. Namely, in the cross section (FIG. 2A) of the BI-MMF 100A perpendicular to the optical axis AX, the trench portion 120A has a non-circularly symmetric shape with respect to the intersection between the optical axis AX and the cross section. In the example of FIG. 2A, the trench portion 120A deviates along the line D, thereby impairing circular symmetry of the trench portion 120A with respect to the optical axis AX (substantially, with respect to the center of the core portion 110A on the cross section). Namely, two figures defined by both of the inner periphery and outer periphery of the trench portion 120A are circles, while center positions of the respective figures are different. In the example of FIG. 2A, the center of the figure defined by the inner periphery of the trench portion 120A is coincident with the center of the core portion 110A, whereas the center of the figure defined by the outer periphery of the trench portion 120A is shifted along the line D from the center of the core portion 110A. In the present specification, a degree of non-circular symmetry as described above is given by formula (4) below. It is noted that, in the cross section of the BI-MMF 100A, $T_{max}$ represents a maximum thickness of the trench portion 120A along the radial direction of the BI-MMF 100A and $T_{min}$ represents a minimum thickness of the trench portion along the radial direction of the BI-MMF 100A. The following definition to define the degree of non-circular symmetry is also applied to the aforementioned embodiments, samples, etc. with the first profile structure.

$$\frac{(T_{max} - T_{min})}{T_{min}} \quad (4)$$

On the other hand, the BI-MMF 100B having the second profile structure (corresponding to the BI-MMF 100 of the first embodiment), as shown in FIG. 2B, has a core portion 110B extending along the optical axis AX, a trench portion 120B provided on the outer periphery of the core portion 110B, and a first cladding portion 130B provided on the outer periphery of the trench portion 120B, as in the first profile structure (FIG. 2A). The BI-MMF 100A (FIG. 2A) and the BI-MMF 100B (FIG. 2B) are different in the sectional shape of the trench portion. In the BI-MMF 100B shown in FIG. 2B, the core portion 110B is doped with $GeO_2$ for adjustment of the shape of refractive index profile and has the maximum refractive index n1. The trench portion 120B is doped with a refractive index decreasing agent such as fluorine, for imparting bend-insensitivity to the BI-MMF 100B and has the refractive index n2 (<n1). The first cladding portion 130B is pure silica or a glass region doped with an impurity for adjustment of refractive index and has the refractive index n3 lower than the maximum refractive index n1 of the core portion 110B and higher than the refractive index n2 of the trench portion 120B (n2<n3<n1).

The refractive index profile 150B of the BI-MMF 100B shown in FIG. 2B represents the refractive indices of the respective portions on the line D (coincident with the radial direction of the BI-MMF 100B) perpendicular to the optical axis AX and, more specifically, a region 151E indicates the refractive indices at respective points of the core portion 110B along the line D, a region 152E indicates the refractive indices at respective points of the trench portion 120B along the line D, and a region 153B indicates the refractive indices at respective points of the first cladding portion 130B. The region 151B in the refractive index profile 150B in FIG. 2B has a dome shape, as in the example shown in FIG. 2A. Furthermore, the structural parameters of the core portion 110B are the same as in the case of the example of FIG. 2A.

Particularly, in the BI-MMF 100B having the second profile structure in FIG. 2B, the trench portion 120B has a part where the thickness along the radial direction of the BI-MMF 100B is 0. Although the BI-MMF 100B has the part where the trench portion is absent (the part where the thickness along the radial direction is 0) along the circumferential direction around the center at the optical axis AX in this manner, it is considered that there is no significant difference of technical effect between the first profile structure (FIG. 2A) and the second profile structure (FIG. 2B). It is noted that a non-circular figure defined by the outer periphery of the trench portion 120B is not limited to figures partly including a straight line as shown in FIG. 2B. For example, the figure defined by the outer periphery of the trench portion 120A while the center of the figure defined by the inner periphery of the trench portion 120B coincides with the center of the core portion 110B may be a non-circular shape such as an ellipse or a rectangle, irrespective of whether or not the center thereof is coincident with the center of the core portion 110B.

Second Embodiment

FIG. 3A is a drawing showing a sectional structure and a refractive index profile along the line II-II in FIG. 1C, as a first profile structure of a BI-MMF 200 according to the second embodiment, and FIG. 3B is a drawing showing a sectional structure and a refractive index profile along the line II-II in FIG. 1C, as a second profile structure of the BI-MMF 200 according to the second embodiment.

First, the BI-MMF 200A having the first profile structure (corresponding to the BI-MMF 200 of the second embodiment) has, as shown in FIG. 3A, a core portion 210A extending along the optical axis AX, a second cladding portion 220A provided on the outer periphery of the core portion 210A, a trench portion 230A provided on the outer periphery of the second cladding portion 220A, and a first cladding portion 240A provided on the outer periphery of the trench portion 230A. The BI-MME 100A (FIG. 2A) and the BI-MIME 200A (FIG. 3A) are different in presence/absence of the second cladding portion 220A, but have no significant difference in the sectional shape of the trench portion 230A. Therefore, it can be assumed that the same technical effect as that by the BI-MMF 100A can be achieved by the BI-MMF 200A. In the BI-MME 200A shown in FIG. 3A, the core portion 210A is doped with GeO$_2$ for adjusting the shape of refractive index profile and has the maximum refractive index n1. The trench portion 230A is doped with a refractive index decreasing agent such as fluorine, for imparting bend-insensitivity to the BI-MMF 200A, and has the refractive index n2 (<n1). Each of the first cladding portion 240A and the second cladding portion 220A is pure silica or a glass region doped with an impurity for adjustment of refractive index and has the refractive index n3 lower than the maximum refractive index n1 of the core portion 210A and higher than the refractive index n2 of the trench portion 230A (n2<n3<n1).

The refractive index profile 250A of the BI-MMF 200A shown in FIG. 3A represents the refractive indices of the respective portions on the line D (coincident with the radial direction of the BI-MMF 200A) perpendicular to the optical axis AX and, more specifically, a region 251A indicates the refractive indices at respective points of the core portion 210A along the line D, a region 252A indicates the refractive indices at respective points of the second cladding portion 220A along the line D, a region 253A indicates the refractive indices at respective points of the trench portion 230A along the line D, and a region 254A indicates the refractive indices at respective points of the first cladding portion 240A. The region 251A in the refractive index profile 250A in FIG. 3B has a dome shape, as in the example shown in FIG. 2A (the BI-MMF 100A). Furthermore, the structural parameters of the core portion 210A are the same as in the case of the example of FIG. 2A.

In the BI-MMF 200A having the first profile structure as the second embodiment, the trench portion 230A also has the special sectional shape, as in the BI-MMF 100A (FIG. 2A). Namely, in the cross section (FIG. 3A) of the BI-MMF 200A perpendicular to the optical axis AX, the trench portion 230A has a non-circularly symmetric shape with respect to the intersection between the optical axis AX and the cross section. In the example of FIG. 3A as well, the trench portion 230A deviates along the line D, thereby impairing circular symmetry of the trench portion 230A with respect to the optical axis AX. In the BI-MMF 200A in FIG. 3A, a degree of non-circular symmetry of the trench portion 230A with respect to the optical axis AX is also given by the aforementioned formula (4).

On the other hand, the BI-MMF 200B having the second profile structure (corresponding to the BI-MMF 200 of the second embodiment), as shown in FIG. 3B, has a core portion 210B extending along the optical axis AX, a second cladding portion 220B provided on the outer periphery of the core portion 210B, a trench portion 230B provided on the outer periphery of the second cladding portion 220B, and a first cladding portion 240B provided on the outer periphery of the trench portion 230B. The BI-MMF 100B (FIG. 2B) and the BI-MMF 200B (FIG. 3B) are different in presence/absence of the second cladding portion 220B, but have no significant difference in the sectional shape of the trench portion 230B. Therefore, it can be assumed that the same technical effect as that by the BI-MMF 100B can also be achieved by the BI-MMF 200B. In the BI-MMF 200B shown in FIG. 3B, the core portion 210B is doped with GeO$_2$ for adjusting the shape of refractive index profile and has the maximum refractive index n1. The trench portion 230B is doped with a refractive index decreasing agent such as fluorine, for imparting bend-insensitivity to the BI-MMF 200B, and has the refractive index n2 (<n1). Each of the first cladding portion 240B and the second cladding portion 220B is pure silica or a glass region doped with an impurity for adjustment of refractive index and has the refractive index n3 lower than the maximum refractive index n1 of the core portion 210B and higher than the refractive index n2 of the trench portion 230B (n2<n3<n1).

The refractive index profile 250B of the BI-MMF 200B shown in FIG. 3B represents the refractive indices of the respective portions on the line D (coincident with the radial direction of the BI-MME 200B) perpendicular to the optical axis AX and, more specifically, a region 251B indicates the refractive indices at respective points of the core portion 210B along the line D, a region 252B indicates the refractive indices at respective points of the second cladding portion 220B along the line D, a region 253B indicates the refractive indices at respective points of the trench portion 230B along the line D, and a region 254B indicates the refractive indices at respective points of the first cladding portion 240B. The region 251B in the refractive index profile 250B in FIG. 3B has a dome shape, as in the example shown in FIG. 2A (the BI-MMF 100A). Furthermore, the structural parameters of the core portion 210B are the same as in the case of the example of FIG. 2A.

Particularly, in the BI-MMF 200B having the second profile structure in FIG. 3B, the trench portion 230B also has a part where the thickness along the radial direction of the BI-MMF 200B is 0 (where the figure defined by the outer periphery of the trench portion 230B is non-circular), as in the BI-MMF 100B (FIG. 2B). Although the BI-MMF 200B has the part where the trench portion is absent along the circumferential direction around the center at the optical axis AX in this manner, it is considered that there is no significant difference of technical effect between the first profile structure (FIG. 3A) and the second profile structure (FIG. 3B) and, as a result, it can be assumed that the same technical effect as that achieved by the BI-MMF 100A (FIG. 2A) is also achieved by the BI-MMF 200B.

(Evaluation of Optical Characteristics)

Figure 5:
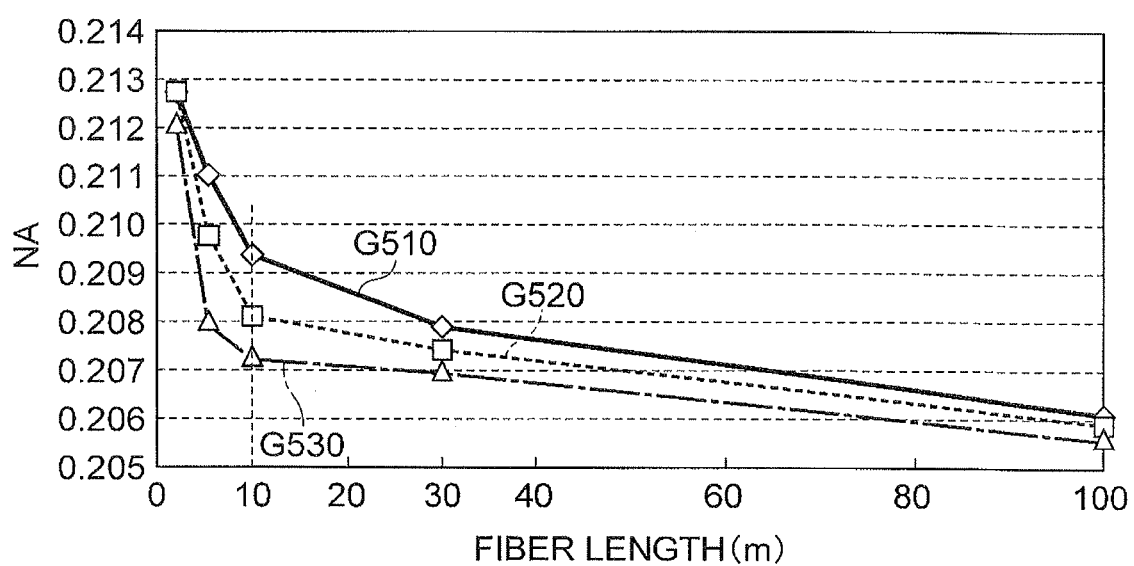
FIG. 5 is graphs showing length dependence of NA values for each of the first sample having the first profile structure of the first embodiment, the second sample having the first profile structure of the first embodiment, and the sample of the comparative example, as examples showing the length dependence of optical characteristics in various types of BI-MMFs.

Next, for various samples of BI-MMFs according to the first embodiment, the results of evaluation of the effect to reduce the length dependence of optical characteristics and the effectiveness of bend-insensitivity are shown in FIGS. 5, 6A, and 6B. These drawings also show the evaluation results of a comparative example and others for reference. The evaluation results are those on the first profile structure of the first embodiment but, since we can assume that the evaluation results similar to those are also obtained for the second profile structure of the first embodiment, the first profile structure of the second embodiment, and the second profile structure of the second embodiment as described above, the evaluation results of these structures are omitted. Namely, the structural difference between the first embodiment and the second embodiment is just the distance from the core portion to the trench portion (there is the second cladding portion provided between the core portion and the trench portion in the second embodiment), and there is no structural difference in the trench portion itself. Furthermore, the difference between the first profile structure and the second profile structure is the sectional shape of the trench portion, and in either structure there is no significant difference recognized as to removal of higher-order modes out of propagation modes which affect the optical characteristics. Accordingly, it can be presumed that the evaluation results of the second embodiment naturally demonstrate the same tendency as the inspection results of the first embodiment.

Samples of BI-MMPs prepared for the evaluation of the effect to reduce the length dependence of optical characteristics and the effectiveness of bend-insensitivity are a sample of a comparative example with a sectional structure and a refractive index profile shown in FIG. 4A, a first sample with a sectional structure and a refractive index profile shown in FIG. 4B, and a second sample with a sectional structure and a refractive index profile shown in FIG. 4C. It is noted that both of the first and second samples have the first profile structure of the first embodiment (FIG. 2A).

FIG. 4A is a drawing showing a sectional structure and a refractive index profile of sample 100C prepared as a comparative example to the first embodiment, FIG. 4B is a drawing showing a sectional structure and a refractive index profile of first sample 100Aa with the first profile structure, prepared as the first embodiment, and FIG. 4C is a drawing showing a sectional structure and a refractive index profile of second sample 100Ab with the first profile structure, prepared as the first embodiment.

The sample 100C of the comparative example shown in FIG. 4A has a core portion 110C extending along the optical axis AX, a trench portion 120C provided on the outer periphery of the core portion 110O, and a first cladding portion 130C provided on the outer periphery of the trench portion 120C. The core portion 110O has the maximum refractive index n1 at a center thereof (coincident with the optical axis AX) and has the outer diameter of 50 µm. The trench portion 120C has the refractive index n2 (<n1) and has a ring sectional shape with the outer diameter of 56 µm (and the inner diameter of 50 µm). The first cladding portion 130C has the refractive index n3 (n2<n3<n1) and has a ring sectional shape with the outer diameter of 125 µM (and the inner diameter of 56 µm). In the sample 100O of the comparative example, the trench portion 120C has a circularly symmetric sectional shape with respect to the intersection between the optical axis AX and the cross section. Therefore, the thickness T $T_{max}=T_{min}$ in the radial direction of the trench portion 120C in the sample 100C is constant along the circumferential direction around the center at the optical axis AX. Namely, in the sample 100C, the degree of non-circular symmetry given by the aforementioned formula (4) is 0. Furthermore, the relative refractive index difference of the core portion 110C to the first cladding portion 130C, which is given by the aforementioned formula (2), is 1.05%. On the other hand, the relative refractive index difference of the trench portion 120C to the first cladding portion 130C, which is given by the aforementioned formula (3), is −0.6%.

The first sample 100Aa shown in FIG. 4B has a core portion 110Aa extending along the optical axis AX, a trench portion 120Aa provided on the outer periphery of the core portion 110Aa, and a first cladding portion 130Aa provided on the outer periphery of the trench portion 120Aa. The core portion 110Aa has the maximum refractive index n1 at a center thereof (coincident with the optical axis AX) and has the outer diameter of 50 µm. The trench portion 120Aa has the refractive index n2 (<n1) and has a ring sectional shape with the outer diameter of 56 µm (and the inner diameter of 50 µm). The first cladding portion 130Aa has the refractive index n3 (n2<n3<n1) and has a ring sectional shape with the outer diameter of 125 µm (and the inner diameter of 56 µm). In the first sample 100Aa, the trench portion 120Aa has a non-circularly symmetric sectional shape with respect to the intersection between the optical axis AX and the cross section. Namely, the trench portion 120Aa is shifted by 0.3 µm along the line D perpendicular to the optical axis, and the degree of non-circular symmetry given by the aforementioned formula (4) is 0.22 (≥0.2). Furthermore, the relative refractive index difference of the core portion 110Aa to the first cladding portion 130Aa, which is given by the aforementioned formula (2), is 1.05%. On the other hand, the relative refractive index difference of the trench portion 120Aa to the first cladding portion 130Aa, which is given by the aforementioned formula (3), is −0.6%.

Furthermore, the second sample 100Ab shown in FIG. 4C has a core portion 110Ab extending along the optical axis AX, a trench portion 120Ab provided on the outer periphery of the core portion 110Ab, and a first cladding portion 130Ab provided on the outer periphery of the trench portion 120Ab. The core portion 110Ab has the maximum refractive index n1 at a center thereof (coincident with the optical axis AX) and has the outer diameter of 50 µm. The trench portion 120Ab has the refractive index n2 (<n1) and has a ring sectional shape with the outer diameter of 56 µm (and the inner diameter of 50 µm). The first cladding portion 130Ab has the refractive index n3 (n2<n3<n1) and has a ring sectional shape with the outer diameter of 125 µm (and the inner diameter of 56 µm). In the second sample 100Ab, the trench portion 120Ab has a non-circularly symmetric sectional shape with respect to the intersection between the optical axis AX and the cross section. Namely, the trench portion 120Ab is shifted by 1 µm along the line D perpendicular to the optical axis, and the degree of non-circular symmetry given by the aforementioned formula (4) is 1.0. Furthermore, the relative refractive index difference of the core portion 110Ab to the first cladding portion 130Ab, which is given by the aforementioned formula (2), is 1.05%. On the other hand, the relative refractive index difference of the trench portion 120Ab to the first cladding portion 130Ab, which is given by the aforementioned formula (3), is −0.6%.

FIG. 5 is graphs showing the length dependence of NA values, as optical characteristics in the BI-MMFs of the above-described sample 100C of the comparative example (FIG. 4A), first sample 100Aa (FIG. 4B), and second sample 100Ab (FIG. 4C). In FIG. 5, graph G510 shows the length dependence of NA values in the sample 100C of the comparative example, graph G520 shows the length dependence of NA values in the first sample 100Aa, and graph G530 shows the length dependence of NA values in the second sample 100Ab.

As seen from FIG. 5, the NA values become stable at shorter distances in the first sample 100Aa (graph G520) and the second sample 100Ab (graph G530) than in the sample 100C of the comparative example (graph G510). This is considered to be due to faster leaving of the leaky modes which could propagate because of the optical confinement function of the trench portion to affect the optical characteristics, than in the case of the sample 100C of the comparative example. Specifically, in the first sample 100Aa and the second sample 100Ab, the difference between the NA value in a length of 10 m and the NA value in a length of 100 m is not more than 0.003. In the sample 100C of the comparative example, the difference between the NA value in the 10-m length and the NA value in the 100-m length is 0.0033. In the first sample 100Aa, the difference between the NA value in the 10-m length and the NA value in the 100-m length is 0.0022, which is reduced to ⅔ of the difference in the sample 100C of the comparative example. Furthermore, in the second sample 100Ab, the difference between the NA value in the 10-m length and the NA value in the 100-m length is 0.0016, which is reduced to ½ of the difference in the sample 100C of the comparative example. Therefore, when a variety of BI-MMFs are prepared in fiber lengths of not more than 100 m, the present embodiment also reduces variation in optical characteristics among the prepared BI-MMFs.

As also seen from the comparison between the evaluation result of the first sample 100Aa and the evaluation result of the second ample 100Ab, the difference between the NA value in the 10-m length and the NA value in the 100-m length becomes smaller as the degree of non-circular symmetry given by above formula (4) increases. Accordingly, it becomes feasible to make the difference between the NA value in the 10-m length and the NA value in the 100-m length not more than 0.0016, by designing the trench portion with the degree of non-circular symmetry given by above formula (4) to not less than 1.0 (the trench portion the thickness of a part of which is smaller). In addition, it is readily presumable from the above consideration that the length dependence of optical characteristics can be further reduced in the cases of the BI-MMF 100B and BI-MMF 200B with the trench portion like the second profile structure (FIG. 2B and FIG. 3B) (the trench portion the thickness of which is 0 in part). The standard MMF is often used for premises networks in base stations and the like and there are also increasing demands, particularly, for MMFs adjusted in fiber lengths in the range of 10 to 100 m. Therefore, with reduction in variation of optical characteristics among a plurality of MMFs in the fiber lengths ranging from 10 to 100 m, the scope of application of MMF will be expanded.

FIG. 6A and FIG. 6B are a table and graphs as collection of relationship between bending radius R and 2-turn bending loss, for the standard MMF (without the trench portion), the sample 100C of the comparative example (FIG. 4A), the first sample 100Aa (FIG. 4B), and the second sample 100Ab (FIG. 4C), and FIG. 6C is a drawing showing an installation example of a BI-MMF. The standard MMF has the same sectional structure and refractive index profile as the sample 100C of the comparative example except for the trench portion.

FIG. 6B shows graphs as plots of respective data shown in the table of FIG. 6A and in FIG. 6B, graph G610 shows a bend characteristic (relation between bending radius and bending loss) of the standard MMF, graph G620 a bend characteristic of the sample 100C of the comparative example, graph G630 a bend characteristic of the first sample 100Aa (the example of the first embodiment with the first profile structure), and graph G640 a bend characteristic of the second sample 100Ab (the example of the first embodiment with the first profile structure). As also seen from the comparison among these graphs G610-G640, the sample 100C of the comparative example, the first sample 100Aa, and the second sample 100Ab manufactured as BI-MMFs have higher bend-insensitivity than the standard MMF without the trench portion, while there is no significant difference in bend characteristic among the sample 100C of the comparative example, the first sample 100Aa, and the second sample 100Ab. Particularly, when installed in a premises network in a base station or the like, the BI-MMF 1 can be installed in a sharply bent state (in a state in which it is bent in small radius of curvature) at a plurality of locations indicated by arrows C1 and C2, as shown in FIG. 6C, and the BI-MMF 1 according to the embodiment of the present invention maintains the bend-insensitivity enough to endure the bend in such an installation condition.

According to the BI-MMF of the embodiments of the present invention, as described above, the sectional shape of the trench portion which contributes to the enhancement of bend-insensitivity is set to the non-circularly symmetric shape with respect to the center of the cross section of the BI-MMF (corresponding to the intersection between the optical axis and the cross section). This configuration enables reduction of the length dependence of optical characteristics while maintaining the desired bend-insensitivity.

From the above description of the present invention, it will be obvious that the present invention may be varied in many ways. Such variations are not to be regarded as a departure from the spirit and scope of the present invention, and all improvements as would be obvious to those skilled in the art are intended for inclusion within the scope of the following claims.

What is claimed is:

1. A multimode optical fiber comprising:
a core portion extending along an optical axis and doped with $GeO_2$;
a cladding portion provided around an outer periphery she of the core portion and having a refractive index lower than a maximum refractive index of the core portion; and
a trench portion provided between the core portion and the cladding portion and having a refractive index lower than the refractive index of the cladding portion,
wherein an α value to define a shape of a portion corresponding to the core portion in a refractive index profile in a radial direction of the multimode optical fiber is from 1.9 to 2.2, a maximum relative refractive index difference Δ of the core portion to the cladding portion is from 0.8 to 2.4%, and a diameter of the core portion is from 25 μm to 65 μm,
wherein in a cross section of the multimode optical fiber perpendicular to the optical axis, the trench portion in a section of a predetermined length forming at least a part of the multimode optical fiber has a non-circularly symmetric shape with respect to an intersection between the optical axis and the cross section, and
wherein in the cross section of the multimode optical fiber, the trench portion has a part where a thickness of the trench portion along the radial direction of the multimode optical fiber is 0.

2. The multimode optical fiber according to claim 1, wherein a difference between an NA value in a length of 10 m and an NA value in a length of 100 m is not more than 0.003.

3. The multimode optical fiber according to claim 2, wherein the difference between the NA value in the length of 10 m and the NA value in the length of 100 m is not more than 0.0016.

4. A multimode optical fiber comprising:
a core portion extending along an optical axis and doped with $GeO_2$;
a cladding portion provided around an outer periphery of the core portion and having a refractive index lower than a maximum refractive index of the core portion; and
a trench portion provided between the core portion and the cladding portion and having a refractive index lower than the refractive index of the cladding portion,
wherein an α value to define a shape of a portion corresponding to the core portion in a refractive index profile in a radial direction of the multimode optical fiber is from 1.9 to 2.2, a maximum relative refractive index difference Δ of the core portion to the cladding portion is from 0.8 to 2.4%, and a diameter of the core portion is from 25 μm to 65 μm,
wherein in a cross section of the multimode optical fiber perpendicular to the optical axis, the trench portion in a section of a predetermined length forming at least a part of the multimode optical fiber has a non-circularly symmetric shape with resect to an intersection between the optical axis and the cross section, and wherein in the cross section of the multimode optical fiber, where $T_{max}$ represents a maximum thickness of the trench portion along the radial direction of the multimode optical fiber and $T_{min}$ a minimum thickness of the trench portion along the radial direction of the multimode optical fiber, the trench portion has a shape satisfying the following relation:

$$\frac{(T_{max} - T_{min})}{T_{min}} \geq 0.2.$$

5. The multimode optical fiber according to claim 4, wherein a difference between an NA value in a length of 10 m and an NA value in a length of 100 m is not more than 0.003.

6. The multimode optical fiber according to claim 5, wherein the difference between the NA value in the length of 10 m and the NA value in the length of 100 m is not more than 0.0016.

7. A multimode optical fiber comprising:
a core portion extending along an optical axis and doped with $GeO_2$;
a cladding portion provided around an outer periphery of the core portion and having a refractive index lower than a maximum refractive index of the core portion; and
a trench portion provided between the core portion and the cladding portion and having a refractive index lower than the refractive index of the cladding portion,
wherein an α value to define a shape of a portion corresponding to the core portion in a refractive index profile in a radial direction of the multimode optical fiber is from 1.9 to 2.2, a maximum relative refractive index difference Δ of the core portion to the cladding portion is from 0.8 to 2.4%, and a diameter of the core portion is from 25 μm to 65 μm,
wherein in a cross section of the multimode optical fiber perpendicular to the optical axis, the trench portion in a section of a predetermined length forming at least a part of the multimode optical fiber has a non-circularly symmetric shape with respect to an intersection between the optical axis and the cross section, and
wherein in the cross section of the multimode optical fiber, the trench portion has a shape satisfying the following relation:

$$\frac{(T_{max} - T_{min})}{T_{min}} \geq 1.0.$$

8. A multimode optical fiber comprising:
a core portion extending along an optical axis and doped with $GeO_2$;
a first cladding portion provided around an outer periphery of the core portion and having a refractive index lower than a maximum refractive index of the core portion;
a trench portion provided between the core portion and the first cladding portion and having a refractive index lower than the refractive index of the first cladding portion; and
a second cladding portion provided between the core portion and the trench portion and having a refractive index lower than the maximum refractive index of the core portion and higher than the refractive index of the trench portion,
wherein an α value to define a shape of a portion corresponding to the core portion in a refractive index profile in a radial direction of the multimode optical fiber is from 1.9 to 2.2, a maximum relative refractive index difference Δ of the core portion to the first cladding portion is from 0.8 to 2.4%, and a diameter of the core portion is from 25 μm to 65 μm, and
wherein in a cross section of the multimode optical fiber perpendicular to the optical axis, the trench portion in a section of a predetermined length forming at least a part of the multimode optical fiber has a non-circularly symmetric shape with respect to an intersection between the optical axis and the cross section.

9. The multimode optical fiber according to claim 8, wherein in the cross section of the multimode optical fiber, the trench portion has a part where a thickness of the trench portion along the radial direction of the multimode optical fiber is 0.

10. The multimode optical fiber according to claim 8, wherein in the cross section of the multimode optical fiber, where $T_{max}$ represents a maximum thickness of the trench portion along the radial direction of the multimode optical fiber and $T_{min}$ a minimum thickness of the trench portion along the radial direction of the multimode optical fiber, the trench portion has a shape satisfying the following relation:

$$\frac{(T_{max} - T_{min})}{T_{min}} \geq 0.2.$$

11. The multimode optical fiber according to claim 10, wherein in the cross section of the multimode optical fiber, the trench portion has a shape satisfying the following relation:

$$\frac{(T_{max} - T_{min})}{T_{min}} \geq 1.0.$$

12. The multimode optical fiber according to claim 8, wherein a difference between an NA value in a length of 10 m and an NA value in a length of 100 m is not more than 0.003.

13. The multimode optical fiber according to claim 12, wherein the difference between the NA value in the length of 10 m and the NA value in the length of 100 m is not more than 0.0016.

* * * * *